United States Patent Office 2,805,546
Patented Sept. 10, 1957

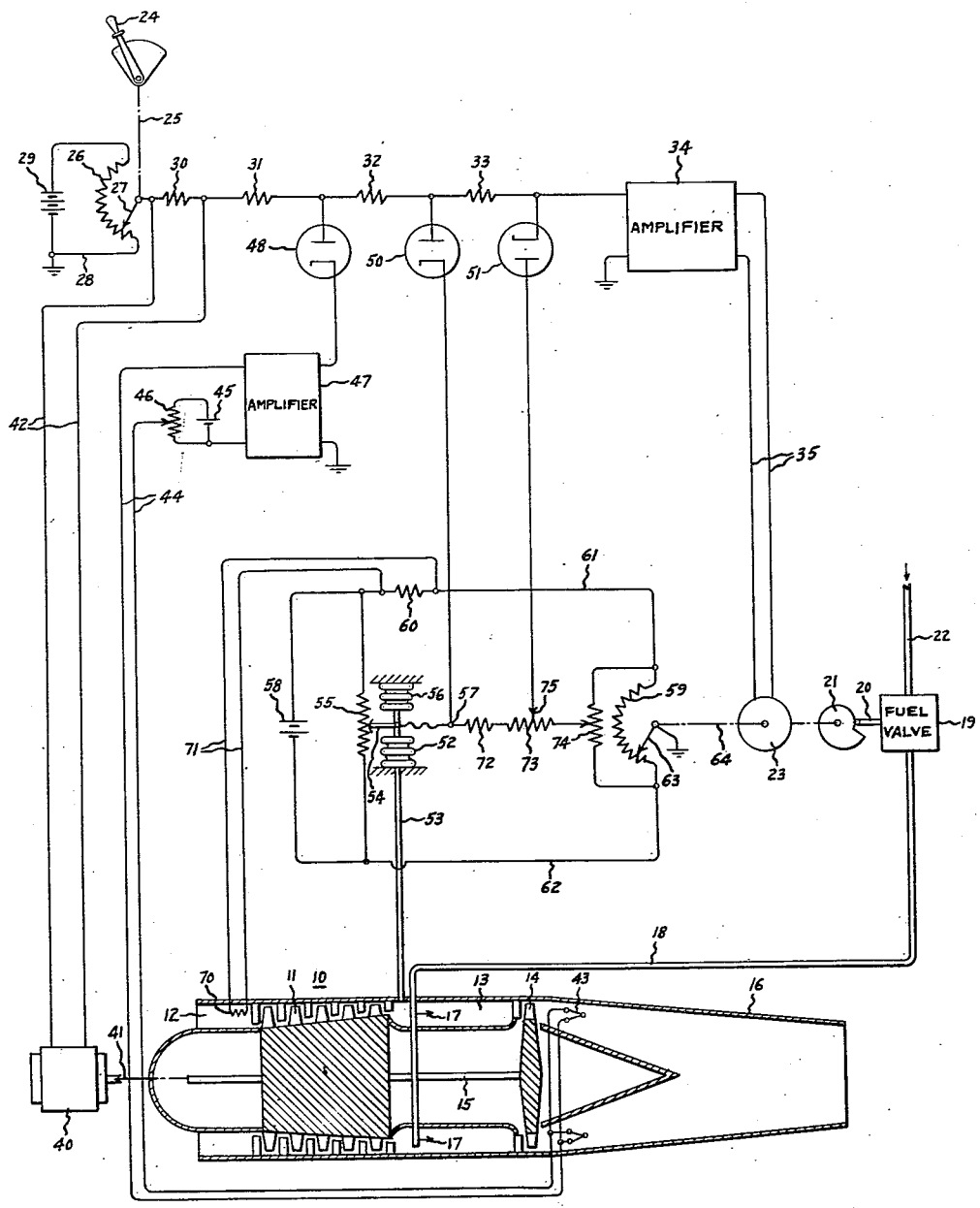

2,805,546

CONTROL SYSTEM HAVING DYNAMIC LIMIT CONTROLS

Clinton C. Lawry and Bruce A. Wells, Schenectady, N. Y., assignors to General Electric Company, a corporation of New York Application January 31, 1952, Serial No. 269,213

11 Claims. (Cl. 60—39.28)

This invention relates to a control system having dynamic control limits, and more particularly to such a system which is especially adapted for employment with a gas turbine power plant.

In control systems for power plants, such as gas turbine power plants, the operator generally desires to select and adjust the power output as his needs may require, and such a selection is generally based on a control of the fuel input. As in other engines, the fuel input is a major factor in determining the power plant speed and the power output is determined by the speed. Accordingly, it is desirable to employ a system in which a power output selector lever is employed to select a signal corresponding to a desired engine speed and power output and an engine speed indicating device is employed to provide a signal opposing the selected signal to indicate the degree of satisfaction of the power output conditions selected. A difference between these opposed signals is transmitted to a fuel valve adjusting device for changing the fuel input to the power plant to achieve the desired power output condition. One system such as this forms a portion of the material disclosed and claimed in our patent application, Serial Number 264,178, filed December 29, 1951, on an "Electrical Speed Control System for Engines" and assigned to the same assignee as the present invention.

Certain demands may be made on the system by adjustment of the power selector, especially in the transient operation during which large changes in speed and output are required, when certain operating conditions of the power plant other than the speed may achieve undesirable values. For instance, the maximum engine temperature may be exceeded beyond which there may be danger of engine destruction. Also, in an attempted fast acceleration of the engine, such a large amount of fuel may be introduced into the combustion chambers as to cause too high a ratio of fuel to combustion air which may cause what has been characterized as aerodynamic "stall" of the engine compressor, a condition of instability within the engine which is not productive of power and may cause damage. Another undesirable result of a mixture too "rich" in fuel is the cessation of combustion, which may be characterized as "rich mixture blow-out." This is very undesirable since an appreciable delay and loss of power will be occasioned by the necessity for "re-starting" the engine at greatly reduced speed. Under engine deceleration conditions, when power output is being reduced, a reduction in fuel below a minimum required level may also result in engine "blow-out."

The limits beyond which these operating conditions should not be permitted to progress may vary in accordance with other engine operating conditions. For instance, both the maximum and the minimum fuel flow limits which should be maintained to prevent "stall" and "blowout" may be a function of the compressor discharge pressure, the pressure of the combustion air available in the combustion chambers, and a function of the compressor inlet temperature, or the temperature of the combustion air entering the engine. These varying limits may be referred to below as dynamic limits. Obviously, it is very desirable to have a precise control for these limiting operating conditions to provide for as wide a range of freedom of control by the operator as possible in order to permit maximum power plant acceleration and operation characteristics when needed. Further, each of the limits should be provided by separate control operation, operative only when needed, instantly available, and dynamically variable in response to variable engine parameters. It is also desirable to avoid placing the responsibility for controlling the fuel input limits on the operator, since other urgent matters may occupy his attention and because of the fallibility of a human operator.

Accordingly, it is one object of this invention to provide an improved control system having dynamic limits.

Another object of this invention is the provision of an improved control system for a power plant for providing selected power output values in terms of fuel flow, but having automatic dynamic limit controls to limit the range of the amount of fuel which may be supplied to the power plant to avoid undesirable power plant operating conditions.

A further object of this invention is to provide an improved fuel control system for a gas turbine power plant having a maximum fuel limit which is varied as a function of compressor discharge pressure to prevent a "stall" condition.

A further object of this invention is to provide a gas turbine power plant fuel control system having a minimum fuel limit which is variable in response to compressor discharge pressure in order to avoid a "blow-out" condition.

Other objects and advantages of this invention will be apparent from the following description and specification.

Accordingly, in carrying out the objects of this invention, an electrical power plant fuel control system may be employed in which a power selecting device selects a voltage corresponding to a speed at which the desired power will be available. This selected voltage is balanced by a tachometer generator which measures the degree of satisfaction of the desired speed, and the resultant speed error voltage is caused to adjust the engine fuel valve. Various limiting controls are connected to the speed error voltage circuit by means of unidirectional conducting devices which are energized with signals of appropriate polarities upon the occurrence of limiting values of engine operating conditions, such as compressor discharge pressure, to overpower the error voltage signal which would otherwise be effective to cause the system to exceed the desired limit.

For a more thorough understanding of this invention, reference should be made to the following specification and the accompanying drawing which is a schematic diagram of a preferred embodiment of this invention. In this drawing, there is shown a gas turbine power plant 10 having a compressor 11, a compressor inlet passageway 12, a combustion chamber 13, a turbine 14 connected to the compressor 11 by means of a shaft 15, and a tail pipe 16. This engine is of the general type employed for reaction power plants for aircraft and often popularly referred to as a "jet engine."

Liquid fuel may be supplied to the combustion chambers 13 of the engine 10 at fuel outlets 17 from a fuel line 18 through a fuel valve 19 which may be a device of conventional construction for providing a rate of liquid fuel flow proportional to the valve position. Valve position may be governed by a cam follower 20 in cooperation with a positioning cam 21. Liquid fuel may be supplied to the valve 19 from a suitable fuel reservoir by means of a suitable pump (not shown) through conduit 22. The cam 21 may be positioned by a motor 23 in order to achieve rotational speeds of the power plant selected by a power lever or thrust selector 24.

The power lever 24 is connected by means of a shaft schematically shown at 25 to the moving brush contact 27 of a variable potentiometer 26. The potentiometer 26 is connected to ground at 28 and across a source of positive direct current voltage such as a battery 29. Adjustment of the potentiometer brush 27 by the power lever 24 through shaft 25 therefore sets a potentiometer voltage which may be transmitted through series connected impedances 30, 31, 32 and 33 to an amplifier 34. The voltage is there amplified and transmitted through connections 35 from the amplifier 34 to positioning motor 23 for changing the position of the fuel valve 19.

A tachometer generator 40 may be connected as schematically shown by a shaft 41, or alternatively by a gear connection, to the rotor of engine 10 for the generation of a voltage proportional to the speed of the rotor which may be transmitted through connections 42 to the impedance 30. The polarity of the voltage supplied from tachometer 40 and applied across the impedance 30 is such as to oppose the voltage signal from the potentiometer brush 27. It will be understood that the tachometer 40 may generate a direct current or that an alternating current tachometer generator may be employed with a suitable rectifier (not shown). When the power output and speed selected by the positioning of potentiometer brush 27 by the power lever 24 has been achieved, the voltage applied by the tachometer generator 40 across the impedance 30 exactly balances the selected voltage so that no error signal voltage is transmitted through the impedances 31, 32, and 33 to the amplifier 34. As thus far described, this is therefore essentially a system for selecting and maintaining a desired power plant speed by automatic control of the power plant fuel input.

Upon acceleration or deceleration conditions of the engine, when a sudden change is made in the setting of the power lever 24, the system may operate in such a way as to supply a much larger or smaller amount of fuel than would be supplied under steady state conditions in order to respectively achieve the increased or decreased speed which is called for. Likewise, constant engine speed conditions may be called for by the power lever 24 in which system operating limits may be exceeded, even during maintenance of the speed called for. For instance, a high level of fuel input may result in dangerously high temperatures, either during acceleration or at constant speed. Accordingly, thermocouples 43 may be located in the tail pipe 16 in the path of combustion gases exhausted from the turbine 14 in order to detect the engine temperature in terms of a direct current voltage which may be transmitted through connections 44 to a temperature circuit including a source of standard voltage such as a cell 45 connected through an adjusting potentiometer 46, and to a suitable amplifier 47. The desired maximum temperature may be selected by the adjustment of potentiometer 46. The voltage from cell 45 supplied through potentiometer 46 is compared with the voltage of the thermocouples 43 and the resultant difference voltage, or temperature error signal, is amplified by the amplifier 47. The output of amplifier 47 is connected through a diode 48 to the junction of series impedances 31 and 32. The amplifier 47 is connected so that, during all temperatures, as indicated by the thermocouples 43, below the maximum allowable temperature, the amplifier output to diode 48 is positive and no conduction to the error voltage circuit junction of impedances 31 and 32 occurs, since the diode 48 is connected to prevent passage of such a positive signal. Upon attainment of an engine temperature above the selected maximum, however, the polarity of the amplifier input from thermocouples 43 and potentiometer 46 changes and the output of amplifier 47 becomes negative so as to cause conduction through diode 48 to reduce the voltage available at series impedance 32. It will be seen that, under these circumstances, any positive error voltage, which would call for an increase of fuel input, transmitted to impedance 31 would be dissipated as a voltage drop through impedance 31 by reason of the conductivity of diode 48. The diode 48 may actually cause the voltage supplied to the impedance 32 to achieve a negative value causing operation of the system to reduce the fuel flow so as to reduce the temperature, if there is a high temperature overshoot. However, a steady state condition in the operation of the temperature limiting circuit will be ultimately achieved in which the conduction in diode 48 will be just sufficient to cause the speed error voltage from selector potentiometer 26, as reduced by the tachometer voltage across impedance 30, to be "dropped" across impedance 31 so that zero potential with respect to ground will be applied at impedance 32, and no change in the position of the fuel valve 19 will occur.

The temperature limiting circuit just described may be subject to instability due to various reasons such as a thermal lag in the thermocouples 43. It may be necessary therefore to employ some means of stabilization. One system for providing such stabilization forms a portion of the material described and claimed in a copending patent application Serial No. 269,281, filed on January 31, 1952, by Harmon P. Bear, now abandoned, for a "Fuel Control System" and assigned to the same assignee as the present invention.

It will be seen that the temperature limit circuit connected through the diode 48 is effective to limit fuel input to the engine under any condition which may cause an excessive temperature. Similar limiting controls are provided by means of the connections afforded through diodes 50 and 51 which are respectively connected to the junction of impedances 32 and 33 and directly to the input of amplifier 34. Diode 50 is provided as part of a maximum fuel circuit for limiting the maximum rate of fuel input on the basis of factors other than engine temperature whenever the cathode potential becomes negative with respect to the anode. The diode 51 is connected to conduct in a direction opposite to that of diodes 48 and 50 to limit the signals of negative polarity transmitted to amplifier 34 to provide a minimum fuel limit. The energizing circuit and network for diodes 50 and 51 will be described below. It may be pointed out here, however, that the operation of the minimum fuel limit diode 51 is analogous to the operation previously described in detail for the temperature limit diode 48, with the obvious exception that the minimum fuel limit diode 51, since it is conductive at an opposite polarity, limits the fuel control circuit in the opposite sense to prevent less than a minimum desired fuel flow. It may be that two or more of the limiting diodes shown may be operative at the same time. If the fuel reducing limit diodes 48 and 50 are concurrently operative, it will be obvious that the one calling for the lowest fuel flow will predominate. As a matter of fact, if the temperature limit diode 48 and its associated circuit calls for a lower maximum fuel flow that the maximum fuel limiting diode 50, the maximum fuel limit diode 50 will not even be operative or conductive. If the minimum fuel limit diode 51 for raising the fuel flow is conductive at the same time as either of the flow lowering diodes 48 or 50, the potential established by the minimum fuel limit diode 51 will be predominant in the control of the system since minimum limit diode 51 is connected directly to the amplifier 34. It will be obvious that additional control diodes of both polarities could be added to the system and that in each case the outer limits of the range of fuel flows provided would be established by the limit diodes providing the narrowest range of variation in fuel flow. Also, the last diode or group of diodes to change polarity in the line of control before the introduction of the control signal to the amplifier would dominate in the control of the system over conflicting signals from prior connected diodes of an opposite polarity. Under most conditions, of course, such a conflict of the limit control would not occur.

The maximum fuel limit control provided through diode 50 is primarily for the purpose of prevention of aerodynamic "stall" of the engine compressor 11. "Stall" conditions may occur at various fuel flow rates dependent upon the compressor discharge pressure, or the pressure of combustion air in the combustion chambers. For a high compressor discharge pressure, a high fuel flow rate may be achieved before stall will occur, but for a lower pressure, a lower fuel rate will cause "stall" conditions. Accordingly, a pressure responsive device such as a bellows 52 is provided which is connected through a pressure line 53 to the compressor discharge area of the interior of the engine to obtain an indication of compressor discharge pressure in terms of the position of a brush 54 of a potentiometer 55 which is fastened to the free end of bellows 52. An evacuated bellows 56 may be provided and connected as shown in opposition to the pressure sensing bellows 52 in order to compensate for the ambient pressure changes to which the exterior of bellows 52 may be subjected. The cathode of diode 50 is joined through a connection 57 to the potentiometer brush 54. A direct current voltage is supplied across the potentiometer 55 by a suitable ungrounded voltage supply such as the battery 58. A fuel valve follow-up potentiometer 59 is connected through a resistance 60 and connections 61 and 62 across the pressure sensing potentiometer 55 and the battery 58. The potentiometer 59 includes a brush 63 which is electrically connected to ground and mechanically connected through the shaft 64 of positioning motor 23 to the fuel valve positioning cam 21 for movement corresponding to the fuel flow adjusting movements of the cam 21 and the fuel valve 19.

It will be seen that the potentiometers 55 and 59, with their ungrounded voltage source 58 and their interconnections including impedance 60 and connections 61 and 62 comprise a position difference signal network for providing a signal indicative of the difference in the positions of the potentiometer brushes 54 and 63 in terms of a potential at connection 57, supplied to the cathode of diode 50, which has a polarity and magnitude with respect to ground corresponding to the direction and magnitude of the position difference. For instance, neglecting the resistance 60, if the grounded follow-up potentiometer brush 63 is positioned at the center of the potentiometer 59, and the pressure senser brush 54 is at the center of its potentiometer 55, then brush 54, connection 57, and the cathode of diode 50 will be at ground potential. This is true because the voltage drops across the corresponding portions of the potentiometers 55 and 59 to the potentiometer brushes 54 and 63 will be equal and the brushes 54 and 63 will therefore be at the same potential. Likewise, any proportionate adjustment of the potentiometer brushes 54 and 63, for instance, an adjustment to one-third of the distance from the upper end of each potentiometer would also result in a ground potential at connection 57. Conversely, any difference in the relative positions of the potentiometer brushes 54 and 63 will produce a voltage at connection 57 with respect to ground having a polarity dependent upon the direction of the difference in position and a magnitude dependent upon the magnitude of such difference. For instance, in the positions of brushes 54 and 63 which are shown, a positive voltage would appear at connection 57. This is true since the fuel valve cam 21 and the follow-up potentiometer brush 63 are shown at the minimum position, connected effectively directly to the negative terminal of battery 58 through connection 62. The brush 54, on the other hand, is connected to an intermediate position on potentiometer 55, which divides the voltage of battery 58 so that a portion of it is applied in a positive sense to the brush 54 and to the connection 57. Under this condition, the diode 50 will not become conductive and the maximum fuel limit will therefore not be effective.

If the pressure sensing potentiometer brush 54 should remain in substantially the position shown, however, and the fuel valve is positioned for higher fuel flows until the fuel valve follow-up potentiometer slider 63 is positioned above the center of potentiometer 59, it will be seen that 57 will become negative, the diode 50 will become conductive, and the maximum fuel limit will therefore become effective.

The maximum fuel limit will generally be effective under maximum engine acceleration conditions during which the compressor discharge pressure will gradually increase, causing the pressure sensing bellows 52 to gradually raise the brush 54 of potentiometer 55 so that larger fuel inputs are gradually permitted without any danger of "stall" conditions. It will be seen from the above explanation that the brush 63 of follow-up potentiometer 59 will never remain proportionately higher than the brush 54 of potentiometer 55. Under initial acceleration conditions, therefore, the fuel valve 19 will be opened to a position where follow-up potentiometer brush 63 achieves a position proportionate to the position of the brush 54 and from then on the maximum fuel limit circuit will be effective to limit the proportionate upward movement of the follow-up brush 63 to the equivalent proportionate movement of brush 54 and to thereby regulate the opening of the fuel valve 19 in accordance with the gradual increase of compressor discharge pressure as greater speeds are achieved.

The amount of fuel which can be safely introduced into the combustion chambers 13 is not only a function of the compressor discharge pressure, but also a function of the temperature of the combustion air. Accordingly, a combustion air temperature sensing device such as a resistor 70 whose resistance value changes with temperature change may be positioned in the compressor intake passage 12. Resistor 70 is joined by means of connections 71 in parallel with the bridge network resistor 60. The voltage drop across the resistors 60 and 70 therefore varies with changing compressor inlet temperatures, a higher temperature resulting in a higher resistance. Since this parallel combination is connected in series in the connection of the potentiometer 59 to the positive side of the voltage source 58, an increase in the temperature detected by resistance 70 and a corresponding resistance increase in the parallel combination of resistors 60 and 70 will appear in the network as the same as an increase in the resistance in the portion of the potentiometer 59 which is connected above the potentiometer brush 63 and therefore analagous to a slight downward movement of the brush 63. It will be seen, therefore, that the connection 57 will be made slightly more positive with respect to ground by an increase in compressor inlet temperature as detected by resistance 70 so that a slightly larger amount of fuel will be permitted for higher inlet temperatures.

An additional network is provided including a resistance 72 and a potentiometer 73 connected in series to connection 57 and to a potentiometer 74 which may be connected in parallel with follow-up potentiometer 59. The adjustable brush contact 75 of potentiometer 73 is connected to the anode of diode 51. By means of this additional network, another voltage is derived from the previously described maximum fuel limiting network which is also a function of the compressor discharge pressure, compressor inlet temperature, and the position of the fuel valve 19. Resistance 72 is chosen with a high resistance value in relation to potentiometer 73 so that, from an electrical impedance standpoint, the diode 51 is connected much more closely to the follow-up potentiometer 59 than to the compressor discharge pressure potentiometer 55. The voltage at potentiometer brush 75 is therefore much more dependent upon the position of follow-up potentiometer brush 63 than brush 54. This additional network, including the diode 51, is a minimum fuel limit circuit which prevents the reduction of the fuel flow below a value which would result in such a "lean" mixture as to prevent continuation of combustion, necessitating a difficult refiring or restarting of the engine and causing a loss of engine power at a time when it may be needed. As mentioned above, such loss of combustion is sometimes called a "blowout."

As pointed out above, the minimum fuel limit diode 51 is connected for conduction at a voltage polarity opposite to that for diodes 48 and 50 as this is a raising fuel limit and the others are lowering limits. The brush 75 of potentiometer 73 will therefore have to become positive with respect to the input to amplifier 34 in order for this limit to become effective. As mentioned above, although there may be conditions where temperature limit diode 48 or maximum fuel limit diode 50 may be operative at the same time that minimum fuel diode 51 is conductive, the minimum fuel limit will be the dominant control since it is connected directly to the amplifier input and may alter the voltages occurring earlier in the control system by means of voltage "drops" (actually voltage "rises" with the polarities shown) which may appear across the impedances 30 through 33. In like manner, it will be seen that the diode 50 may predominate over the control exercised by the diode 48 since the diode 50 is connected "down stream" in the error signal circuit. It will be understood that other limit controls might be connected in a like manner through unidirectional conductive devices, such as the diodes shown, in order to limit the operation of the control system on the basis of other engine conditions. These limiting controls may be truly characterized as "dynamic limits" since the limiting values change with change in the associated engine condition.

It will be seen from the above description that this invention provides an improved control system which is relatively simple though providing a very precise and reliable engine control which permits maximum flexibility while preventing improper engine operation. While one specific embodiment of this invention has been shown and described, it will be understood that various modifications may be made without departing from this invention. The appended claims are therefore intended to cover any such modifications within the true spirit and scope of the invention.

What we claim as new and desire to secure by Letters Patent of the United States is:

1. A direct current voltage responsive control circuit for the adjustment of a control condition of a power plant including a variable source of voltage for selection of a voltage corresponding to a desired operating condition, a second source of variable voltage for producing a voltage dependent upon the achieved operating condition and connected in opposition thereto, means responsive to the combined signals from said voltage sources for adjusting a control condition to obtain the selected operating condition, a series of electrical impedances connecting said adjustable voltage devices to said adjusting means, a plurality of unidirectional conducting devices connected to the junctions of said impedances for imposing dynamic limits on the operation of said adjusting means, each of said unidirectional conducting devices being connected to a means for generating an electrical signal in response to at least one variable operating condition of the power plant.

2. A direct current voltage system for the control of fuel flow to a power plant comprising an adjustable source of direct current voltage for selecting a desired power plant speed in terms of voltage, a tachometer generator connected in series opposition to said selected voltage source, an amplifier, a connection between said series opposed combination and said amplifier for actuation thereof, said connection including a series of impedances, a plurality of rectifiers connected to the junctions of said impedances and voltage signal generating devices connected to each of said rectifiers for providing voltages variable in polarity and magnitude in response to limiting operating conditions of the power plant to limit the range of variation of fuel flow thereto, a positioning motor connected to said amplifier for energization thereby, and a fuel valve connected to said motor for positioning thereby.

3. A limited flow range fuel control system for a gas turbine power plant including an integral compressor comprising means for adjusting the magnitude of fuel flow, means for actuation of said adjusting means in accordance with variably selectable fuel flow rates, means for connection to the compressor for response to the discharge pressure thereof, a differential position indicating means connected to measure the positions of said pressure responsive means and said flow adjusting means and for indicating a function of the difference of the positions thereof, and a connection from said differential position indicating means to said actuating means for limiting the actuation of said adjusting means to impose a dynamic limit to at least one end of the fuel flow range for one direction of relative position difference.

4. A fuel control system for providing fuel flow within a limited range to a gas turbine power plant including an integral compressor comprising an adjustable fuel flow control valve, means for actuation of said valve in accordance with variably selectable fuel flow rates, means for connection to the compressor for response to the discharge pressure thereof, a differential position indicating means connected to measure the positions of said pressure responsive means and said valve and for providing a signal which is a function of the difference of the positions thereof, and a connection from said position indicating means to said actuating means for receiving said signal for limiting the actuation of said valve in at least one direction to impose a dynamic limit on the fuel flow rate for one direction of relative position difference.

5. An electrical control system for an engine for automatically maintaining a desired engine operating condition in accordance with a selected direct current voltage comprising a direct current voltage selection device, a device for generating a voltage indicative of the condition being controlled and connected in series opposition to said voltage selection device, a plurality of impedances connected in series to receive the combined signals from said devices and an electrical positioning system for controlling the position of an engine control device connected to receive energizing signals from said impedances, a unidirectional conductive device connected to the output terminal of each of said impedances, and a voltage generating circuit connected to each of said unidirectional conductive devices for generating a voltage in accordance with an operating condition of the engine.

6. An electrical system for controlling fuel input to a compressor driving gas turbine power plant comprising an adjustable fuel valve, a position-indicating follow-up potentiometer device connected to said fuel valve, a pressure measuring potentiometer device for connection to the power plant for measurement of compressor discharge pressure, said potentiometer devices being connected in parallel across a source of voltage to form a differential position signal generating network having output connections at the potentiometer brushes, an amplifier connected across said output connections, a positioning motor connected for energization from the output of said amplifier, and a mechanical connection from said positioning motor to said fuel valve.

7. A combined maximum and minimum fuel limiting control system for a gas turbine power plant for limiting the maximum and minimum fuel inputs thereto in response to compressor discharge pressure and compressor inlet temperature comprising a valve for regulating the fuel flow to said power plant, a positioning motor connected to said valve for adjustment thereof, an amplifier connected to said motor for energization thereof, a direct current voltage signal circuit including a connection to said amplifier for actuation thereof in a direction dependent upon the direct current voltage polarity of a signal from said signal circuit with respect to an electrical reference point in accordance with desired changes in power plant fuel flow, said last named connection including at least two series connected impedances, a first unidirectional conductive device connected to the common junction of said impedances for conduction in a first direction, a second unidirectional conductive device connected between one of said impedances and said amplifier for conduction in a second direction, an engine compressor discharge pressure measuring potentiometer device, a position indicating follow-up potentiometer connected to said fuel valve positioning motor, said potentiometer devices being connected in parallel across a voltage source to form a differential position signal generating network and including a connection to said electrical reference point for providing a signal indicative of a position difference relationship between said pressure responsive device and said follow-up potentiometer in terms of a differential position signal voltage having a polarity and magnitude with respect to said electrical reference point in accordance with the direction and magnitude of the position difference, said first unidirectional conducting device being connected to transmit differential position signals from said network to said amplifier, a second network connected across said differential position signal generating network and a connection from said second network to said second unidirectional conducting device for transmission of a signal which is a function of the position difference relationship, and a temperature responsive variable resistance element positioned at the compressor intake and connected in series with one of said potentiometers in said differential position signal generating network for modification of the output thereof in response to compressor inlet temperature.

8. A fuel control system for a power plant comprising a voltage selector device for selecting a direct current voltage proportional to a desired engine speed, a tachometer generator for connection for rotation by the engine and connected in series opposition to said voltage selector device, an impedance connected to receive the output voltage from the series opposed combination of said tachometer generator and said voltage selector device, an amplifier connected to receive the voltage transmitted by said impedance, a positioning motor connected for energization from the output of said amplifier, a fuel valve connected for positioning by said positioning motor for controlling the rate of fuel flow to the power plant, a unidirectional conductive device connected to the output end of said impedance; a temperature control circuit including thermocouples for detecting power plant temperature, a source of reference voltage for comparison with the signal from said thermocouples, and a temperature amplifier having an output connection to said unidirectional conductive device.

9. A fuel control system for a power plant comprising a voltage selector device for selecting a direct current voltage proportional to a desired engine speed, a tachometer generator for connection for rotation by the engine and connected in series opposition to said voltage selector device, at least two impedances connected in series to successively transmit the output voltage from the series opposed combination of said tachometer generator and said voltage selector device, an amplifier connected to receive the voltage transmitted by said series connected impedances, a positioning motor connected for energization from the output of said amplifier, a fuel valve connected for positioning by said positioning motor for controlling the rate of fuel flow to the power plant, a unidirectional conductive device connected to the output end of each of said impedances; a temperature control circuit including thermocouples for detecting power plant temperature, a source of reference voltage for comparison with the signal from said thermocouples, and a temperature amplifier connected to one of said unidirectional conductive devices; a maximum fuel limit circuit comprising an ungrounded voltage source, a first electrical potentiometer connected across said voltage source, a pressure responsive device connected for response to a pressure of said power plant and mechanically connected to move the contact brush of said first potentiometer, a resistor and a second potentiometer connected in series across said first potentiometer, a mechanical connection from said positioning motor to the brush of said second potentiometer, a common electrical return connection between the brush of said second potentiometer and said voltage selector device and said first mentioned amplifier, and a connection from said brush of said first potentiometer to the other of said unidirectional conductive devices.

10. A fuel control system for a power plant comprising a voltage selector device for selecting a direct current voltage proportional to a desired engine speed, a tachometer generator for connection for rotation by the engine and connected in series opposition to said voltage selector device, at least three impedances connected in series to successively transmit the output voltage from the series opposed combination of said tachometer generator and said voltage selector device, an amplifier connected to receive the voltage transmitted by said series connected impedances, a positioning motor connected for energization from the output of said amplifier, a fuel valve connected for positioning by said positioning the motor for controlling the rate of fuel flow to the power plant, a unidirectional conductive device connected to the output end of each of said impedances; a temperature control circuit including thermocouples for detecting power plant temperature, a source of reference voltage for comparison with the signal from said thermocouples, and a temperature amplifier connected to a first one of said unidirectional conductive devices; a maximum fuel limit circuit comprising an ungrounded voltage source, a first electrical potentiometer connected across said voltage source, a pressure responsive device connected for response to a pressure of said power plant and mechanically connected to move the contact brush of said first potentiometer, a resistor and a second potentiometer connected in series across said first potentiometer, a mechanical connection from said positioning motor to the brush of said second potentiometer, a common electrical return connection between the brush of said second potentiometer and said voltage selector device and said first mentioned amplifier, a connection from said brush of said first potentiometer to the second one of said unidirectional conductive devices; a minimum fuel limit circuit including a voltage dividing network comprising a third potentiometer connected in parallel with said second potentiometer and a series of impedances connected between the brush of said first potentiometer and the brush of said third potentiometer, a connection from an intermediate point of said last mentioned series impedances to the third one of said unidirectional conductive devices.

11. In a fuel control mechanism responsive to two parameters of operation of an engine, a source of fuel, a throttle valve for controlling the flow of fuel to said engine for varying both of said parameters, means for generating a first signal responsive to the value of one parameter and means for generating a second signal responsive to the value of the second parameter, means for establishing a datum for each of said parameters, means for producing resultant signals from said first and second signals having values commensurate with the direction and extent of departure of said parameters from their respective data, comparator means for comparing said resultant signals including means for selecting a controlling signal from said resultant signals, means responsive to said controlling signal for moving said throttle valve to restore to its datum the parameter whose signal is controlling, said selecting means including means for selecting as the controlling signal the resultant signal which, while the resultant signals retain the same relative values, will give the least fuel flow.

References Cited in the file of this patent

UNITED STATES PATENTS

| | | |
|---|---|---|
| 2,623,354 | Best | Dec. 30, 1952 |
| 2,631,677 | Kochenburger et al. | Mar. 17, 1953 |
| 2,697,908 | Offner | Dec. 28, 1954 |

FOREIGN PATENTS

| | | |
|---|---|---|
| 580,149 | Great Britain | Aug. 8, 1946 |
| 941,556 | France | July 19, 1948 |